O. Willis,
Making Fellies.
Nº 10,042. Patented Sep. 20, 1853.
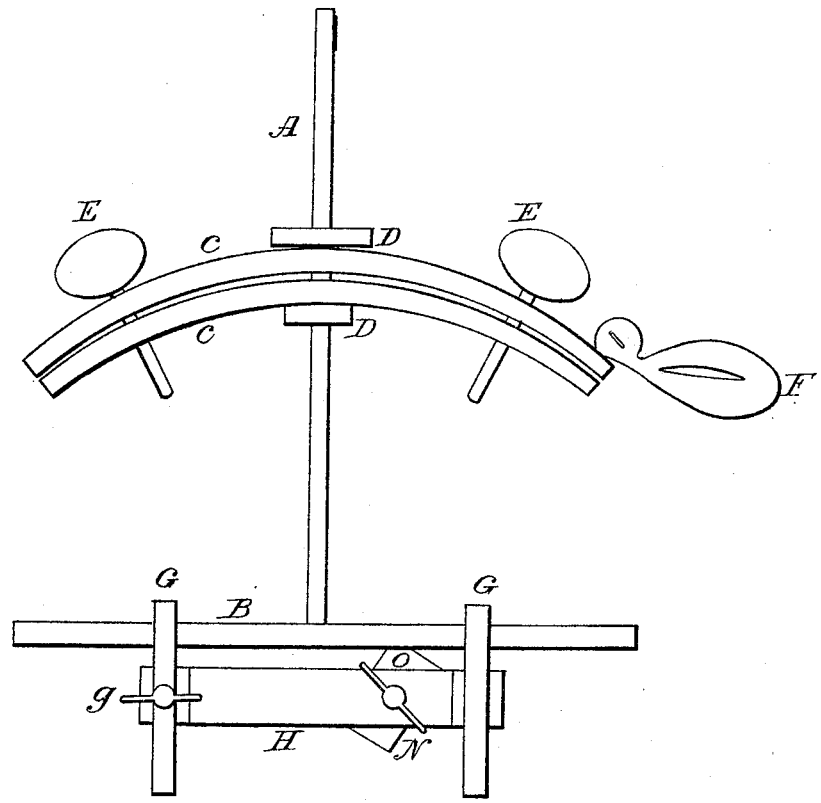
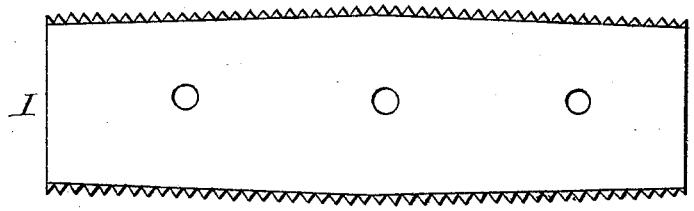
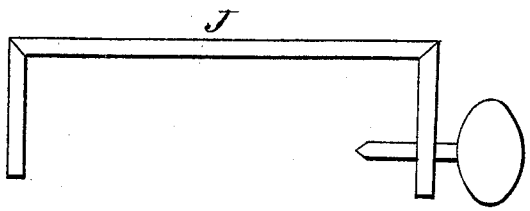

UNITED STATES PATENT OFFICE.

OSCAR WILLIS, OF BRINDLETOWN, NORTH CAROLINA.

SAW FOR WATER-WHEELS.

Specification of Letters Patent No. 10,042, dated September 20, 1853.

*To all whom it may concern:*

Be it known that I, OSCAR WILLIS, of Brindletown, in the county of Burke and State of North Carolina, have invented a new Saw-Engine for the Purpose of Inserting Iron Buckets in Wooden Water-Wheels for Mills and other Machinery; and I do hereby declare that the following is a full and exact description.

*Specification of engine saw.*—A, is a rod with a screw commencing at the upper end and extending half way down to rod B, and connected with it at the middle and through holes in parts G, G, so that it will work backward and forward to where the rods are connected to each other at B.

G, G, are two small pieces made of iron and fastened to the small bar of iron H, one of them having a screw that may be placed on or off at pleasure, whenever the rod B, is desired to be taken off, the other is riveted fast.

N, is a tap and screw connected with bar H, for the purpose of screwing it fast to a rod of wood O, extending from the center of the wheel for the purpose of setting the engine to cut the orifices for the buckets.

C, are two circling pieces of iron made of any sized circle in proportion to the thickness of the wheel that is desired for cutting the proper shaped buckets with two screws through it at each end for the purpose of drawing them close together to contain the saw I which brings the saw to the same shape they are.

D, D, are two taps intended for setting the saw frame nearer or farther from the rod B, which acts as a center to it so as to get it to a proper distance that the saw will follow it as a circle in proportion to the size of its circle.

F, is a handle by which it is worked.

J, is a clamp of iron with a screw in it for the purpose of confining bar H, that is connected with the wooden rod that extends from the center of the wheel and to which the bar H, is fastened so that the saw cannot move from its place when in use, the object of rod B, being to slide backward and forward that the saw may be brought to bear upon nut and rim at the same setting that the buckets may be cut uniform,—that is by sawing with the teeth on one side then sliding it to the other side, sawing the nut or rim as it may be then unscrew the clamp and move it to where you desire another orifice to be cut for the bucket and clamp it to keep it from moving until another orifice for another bucket is cut.

By this operation when the engine is set to the desired degree of inclination for the buckets, a perfect uniformity will be presented throughout the wheel.

Having thus fully described the nature of my invention, what I claim therein as new, and desire to secure by Letters Patent is,

An adjustable apparatus for sawing out the grooves or fillets in water-wheels for the reception of the buckets, composed of a two edged saw sprung between clamps, and connected by a screw rod A, to a sliding bar B, when said sliding bar is made adjustable upon a radius arm O, hung to the center of the wheel, the whole being combined and operating substantially as described.

OSCAR WILLIS.

Witnesses:
R. M. S. TATE,
J. McD. CARSON.